United States Patent
Lee et al.

(10) Patent No.: US 11,157,067 B2
(45) Date of Patent: Oct. 26, 2021

(54) POWER SHIFTING AMONG HARDWARE COMPONENTS IN HETEROGENEOUS SYSTEM

(71) Applicant: INTERNATIONAL BUSINESS MACHINES CORPORATION, Armonk, NY (US)

(72) Inventors: Eun Kyung Lee, Bedford Corners, NY (US); Alper Buyuktosunoglu, White Plains, NY (US); Martha Broyles, Austin, TX (US); Todd Rosedahl, Zumbrota, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/714,730

(22) Filed: Dec. 14, 2019

(65) Prior Publication Data

US 2021/0181830 A1 Jun. 17, 2021

(51) Int. Cl.
G06F 1/32 (2019.01)
G06F 1/3287 (2019.01)

(52) U.S. Cl.
CPC .................. *G06F 1/3287* (2013.01)

(58) Field of Classification Search
CPC .................................................. G06F 1/3287
See application file for complete search history.

(56) References Cited

U.S. PATENT DOCUMENTS

| | | | |
|---|---|---|---|
| 8,276,012 B2 | 9/2012 | Hanson et al. | |
| 8,782,450 B2 | 7/2014 | Cepulis et al. | |
| 9,014,284 B2 | 4/2015 | Jiang | |
| 9,026,818 B2 | 5/2015 | Hanson et al. | |
| 9,684,366 B2 | 6/2017 | Allen-Ware et al. | |
| 9,760,159 B2 | 9/2017 | Putnam et al. | |

(Continued)

FOREIGN PATENT DOCUMENTS

EP 3062192 A1 8/2016

OTHER PUBLICATIONS

Felter, W. et al., "A Performance-Conserving Approach for Reducing Peak Power Consumption in Server Systems"; ACM (2005); 10 pgs.

(Continued)

*Primary Examiner* — Stefan Stoynov
(74) *Attorney, Agent, or Firm* — Intelletek Law Group, PLLC; Gabriel Daniel, Esq.

(57) ABSTRACT

A power controller that controls power usage of a heterogeneous system is provided. The power controller receives a power usage cap for a heterogeneous system that includes multiple components. The power controller assigns priorities that respectively correspond to the multiple components. The power controller assigns power shifting ratios that respectively correspond to the multiple components. The power controller adjusts a total power usage of the multiple components to be within a threshold of the power usage cap by adjusting the power usage of individual components in a sequence defined by the assigned priorities. The power controller shifts a power usage from a first-priority component to a second-priority component (and so on) according to the assigned power shifting ratios.

17 Claims, 7 Drawing Sheets

(56) References Cited

U.S. PATENT DOCUMENTS

| | | | |
|---|---|---|---|
| 10,268,262 B2 | 4/2019 | Tian | |
| 10,270,641 B2 | 4/2019 | Kim et al. | |
| 2013/0268791 A1* | 10/2013 | Yamana | G06F 1/3206 713/323 |
| 2015/0185814 A1* | 7/2015 | Ping | G06F 1/206 713/323 |
| 2017/0017288 A1 | 1/2017 | Bose et al. | |
| 2017/0308147 A1 | 10/2017 | Bose et al. | |
| 2018/0267597 A1 | 9/2018 | Allen-Ware et al. | |
| 2019/0041937 A1 | 2/2019 | Li et al. | |
| 2019/0041969 A1 | 2/2019 | Nge et al. | |
| 2019/0065243 A1 | 2/2019 | Eckert | |

OTHER PUBLICATIONS

Gholkar, N. et al., "PShifter: Feedback-Based Dynamic Power Shifting within HPC Jobs for Performance"; ACM (2018); 12 pgs.

Lefurgy, C. et al., "Power Capping: A Prelude to Power Shifting"; ResearchGate (2008); 21 pgs.

Savoie, L. et al., "I/O Aware Power Shifting"; Lawrence Livermore National Laboratory, LLNL-CONF-669729 (2015); 12 pgs.

* cited by examiner

POWER SHIFTING AMONG HARDWARE COMPONENTS IN HETEROGENEOUS SYSTEM

BACKGROUND

Technical Field

The present disclosure generally relates to power management of computer systems.

Description of the Related Arts

A heterogeneous system includes multiple hardware components sharing the same power source. A datacenter includes many nodes that are each a heterogeneous system. A datacenter is also a large system having a limited power budget. Power cap functions can be implemented at the nodes of the datacenter to ensure that the datacenter operates within a specified power budget.

SUMMARY

Some embodiments of the disclosure provide a power controller that controls the power usage of a heterogeneous system. The power controller receives a power usage cap for a heterogeneous system that includes multiple components. The power controller assigns priorities that respectively correspond to the multiple components. The power controller assigns power shifting ratios that respectively correspond to the multiple components. The power controller adjusts a total power usage of the multiple components to be within a threshold of the power usage cap by adjusting power usages of individual components in a sequence defined by the assigned priorities. The power controller shifts a power usage from a first-priority component to a second-priority component (and so on) according to the assigned power shifting ratios.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a power shifting method for managing power usage among multiple hardware components of a heterogeneous system. In some embodiments, the power shifting method is implemented by one or more processors that are configured as a power controller. The power controller controls the power usages of the multiple hardware components of the heterogeneous system by controlling power related settings such as supply voltages, clock frequencies, etc.

Figure 1:
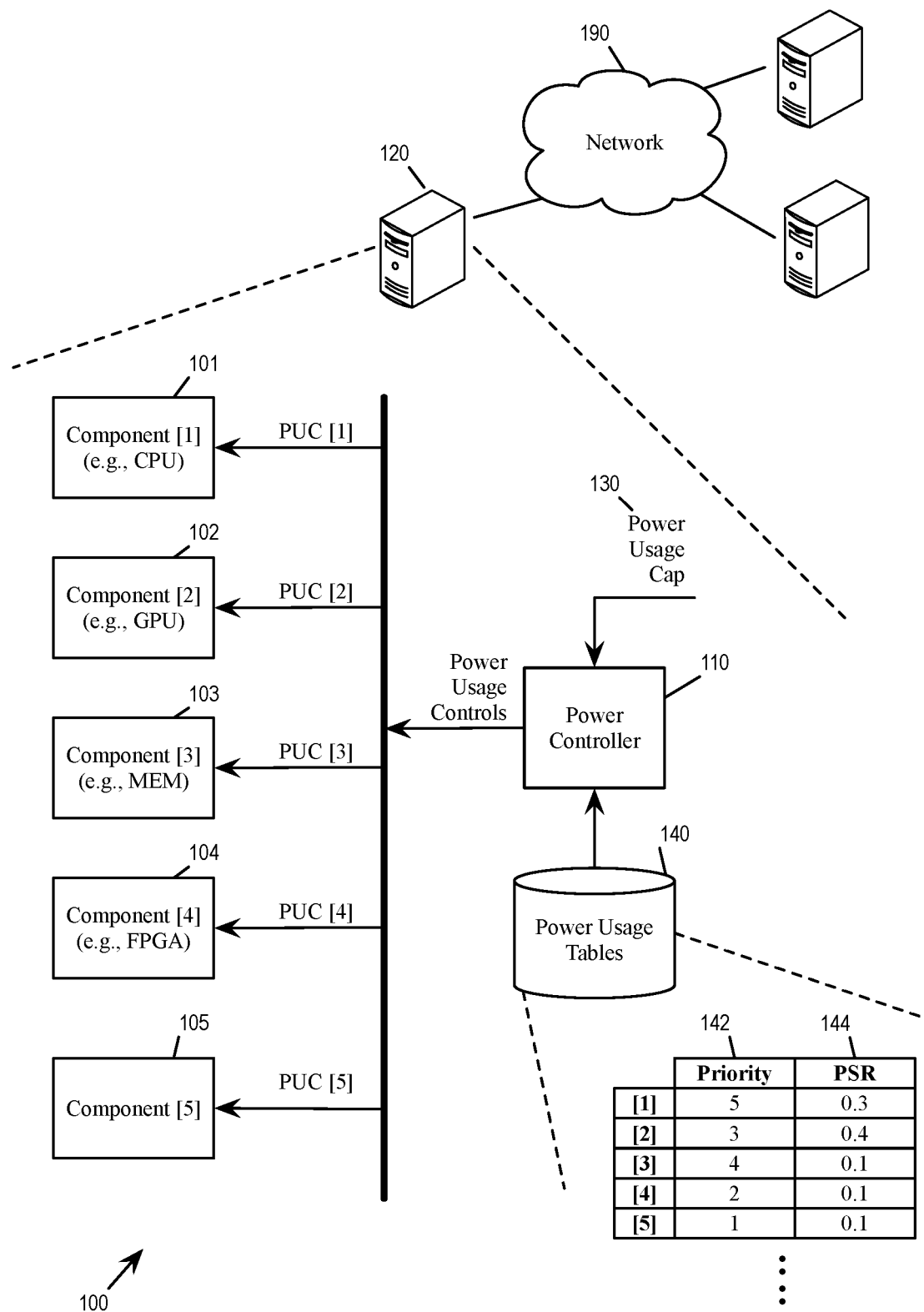
FIG. 1 conceptually illustrates a heterogeneous system having multiple components whose power usages are controlled by a power controller.

FIG. 1 conceptually illustrates a heterogeneous system 100 having multiple components whose power usages are controlled by a power controller 110. As illustrated, the heterogeneous system includes components 101-105 (labeled components [1] through [5] in the figure) that correspond to devices such as a central processing unit (CPU), a graphic processing unit (GPU), a memory (MEM), a field programmable gate array (FPGA), etc. The power controller 110 may be implemented by computing device 120. Specifically, the power controller 110 may be a module of software instructions being executed by one or more processing units (e.g., a processor) of the computing device 120. The power controller 110 may also be a module of hardware circuits in one or more integrated circuits (ICs) of an electronic apparatus such as the computing device 120. An example computing device that may implement the power controller 110 will be described by reference to FIG. 7 below.

The heterogeneous system 100 may be a node of a network 190. In some embodiments, the components of the heterogeneous system 100 are also components of the computing device 120, such that the power controller 110 may communicate with the components of the heterogeneous system through internal wiring of the computing device 120.

In some embodiments, the power controller 110 and the heterogeneous system 100 may not be in a same computing device, and the power controller 110 communicates with the components of the heterogeneous system 100 through discrete wiring in a larger system that includes both the power controller 110 and the heterogeneous system 100.

The power controller 110 controls each component 101-105 of the heterogeneous system 100 through a set of power usage controls (PUCs). (The PUCs of the components 101-105 are labeled as PUC[1] through PUC[5] in the figure.) The PUC for a component may include supply voltage setting, clock frequency setting, data rate, and other settings that may affect the power usage of the component. The power controller 110 may determine a total power usage of the heterogeneous system 100 based on the settings of the PUCs provided to the individual components 101-105. The power controller 110 may also determine the total power usage based on a power measurement of the heterogeneous system 100. Total power usage of the heterogeneous system may also be referred to as total system power.

The power controller 110 receives a power usage cap 130 for the heterogeneous system. Power usage cap may also be referred to as active power limit or power cap. Power usage cap may be a customer set power limit or a system defined power limit based on the current power delivery capacity. Such a power limit may be reduced by power outage, power supply fault, or power supply removal. The power controller 110 controls the total power usage of the heterogeneous system to meet or satisfy the power usage cap 130. In some embodiments, the total power usage of the heterogeneous system 100 is considered to have met or satisfied the power usage cap 130 when it is within a threshold range of the power usage cap 130.

In some embodiments, the power controller 110 controls the total power usage of the heterogeneous system 100 by throttling the power usages of the different components of the heterogenous system. The power throttling is performed based on priorities and power shifting ratios (PSRs) assigned to each of the component of the heterogeneous system 100. Specifically, the power controller 110 adjusts the power usages of individual components in a sequence defined by the assigned priorities. The power controller 110 also shifts power usages among the different components according to their assigned PSRs while the total power usage remains within the threshold range of the power usage cap 130.

As illustrated, the priorities and the PSRs assigned to the individual components of the heterogeneous system 100 are stored in a power usage table 140 to be used by the power controller 110. The power usage table 140 includes a priority table 142 and a PSR table 144 that respectively store the priorities and the PSRs assigned to the individual components of the heterogeneous system 100. The power controller adjusts or shifts the power usage of each individual component of the heterogeneous system 100 by adjusting the PUC of that individual component. The power usage cap, along with the PSRs and the priorities stored in the power usage table 140 may be updated during real-time operation of the heterogeneous system such that the power controller 110 may set the PUCs of the individual components based on their dynamically updated priorities and PSRs.

Figure 2:
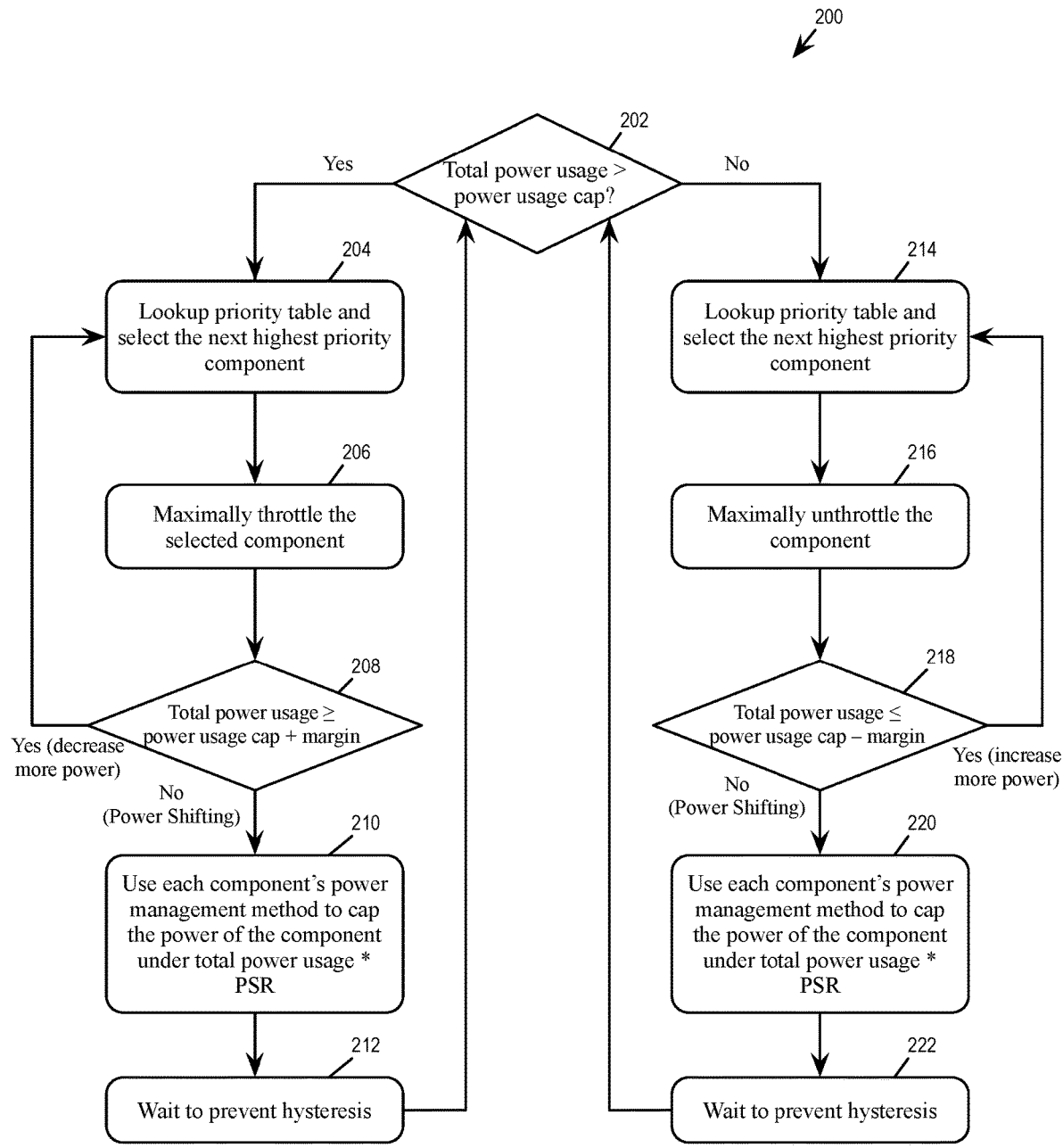
FIG. 2 conceptually illustrates a process for adjusting power usage of the heterogenous system based on the power usage cap, consistent with an exemplary embodiment.

FIG. 2 conceptually illustrates a process 200 for adjusting power usages of the heterogenous system based on the power usage cap, consistent with an exemplary embodiment. The process 200 is used by the power controller 110 to monitor a difference between the total power usage and the power usage cap and to adjust the power usages of the individual components. The power adjustment of the individual components is based on priorities and PSRs assigned to the components of the heterogeneous system. In some embodiments, one or more processing units (e.g., processor) of a computing device implementing the power controller 110 (e.g., the computing device 120) perform the process 200 by executing instructions stored in a computer readable medium.

The power controller compares (at block 202) the total power usage of the heterogeneous system with the power usage cap. The total power usage may be determined based on the settings of the power usage controls provided to the individual components or a power measurement of the heterogeneous system. In some embodiments, the power controller dynamically and continuously determines the total power usage of the heterogeneous system in real-time. If the total power usage is greater than the power usage cap, the process proceeds to block 204. If the total power usage is less than the power usage cap, the process proceeds to block 214. In some embodiments, the process is used to keep the total power usage within a threshold range of the power usage cap. For example, the process may proceed to block 204 only when the total power usage is greater than the power usage cap by an additional margin or threshold value, and the process may proceed to block 214 when the total power usage is less than the power usage cap by an additional margin or threshold value.

The power controller selects (at block 204) the next highest priority component by looking up the priority table 142. For example, in FIG. 1, the power controller would first select component 101 (component[1] has priority 5), then component 103 (component[3] has priority 4), then component 102 (component[2] has priority 3), then component 104 (component[4] has priority 2), then component 105 (component[5] has priority 1), etc.

The power controller then maximally throttles (at block 206) the selected component. The power controller may use a method that is specific to the selected component to reduce the component's power usage to an allowable minimum for that component and for the heterogeneous system 100, e.g., by lowering the voltage supply and/or the clock frequency to a minimally acceptable level for that component.

The power controller then determines (at block 208) whether the total power usage of the heterogenous system is greater than the power usage cap plus a margin, i.e., whether the total power usage is still too large. If so, the process returns to block 204 to select the next highest priority component and to maximally throttle the component's power usage. If the total power usage is not greater than the power usage cap by a margin, the process proceeds to block 210.

The power controller uses (at block 210) each component's power management method to cap the power usage of each component according to the component's PSR as defined by the PSR table 144. In other words, the power controller distributes the total power usage among the components of the heterogenous system while satisfying the power usage cap of the heterogenous system. Each component is allocated a portion of the total power usage according to the PSR assigned to the component. In some embodiments, the PSR or each component represents the fraction of the total power usage that is allocated to the component. (The sum of all the PSRs is 1.0, and the power usage allocated to each component is the product of the component's PSR and the total power usage.)

The power controller then waits (at block 212) for a specified amount of time to prevent power hysteresis before returning to the block 202 to continue monitoring the difference between the total power usage and the power usage cap.

The power controller selects (at block 214) the next highest priority component by looking up the priority table 142. The power controller then maximally un-throttles (at block 216) the selected component. The power controller may use a method that is specific to the selected component to increase the component's power usage to an allowable maximum for that component and for the heterogeneous system 100, e.g., by upping the voltage supply and/or the clock frequency of the component to a maximum acceptable level.

The power controller then determines (at block 218) whether the total power usage of the heterogenous system is less than the power usage cap minus a margin, i.e., whether the total power usage is still too small. If so, the process returns to block 214 to select the next highest priority component and to maximally un-throttle the component's power usage. If the total power usage is not greater than the power usage cap by a margin, the process proceeds to block 220.

The power controller uses (at block 220) each component's power management method to cap the power usage of each component according to the component's PSR as defined by the PSR table 144. The power controller then waits (at block 222) for a specified amount of time to prevent hysteresis before returning to the block 202 to continue monitoring the difference between the total power usage and the power usage cap.

In some embodiments, the distribution of total power usage of blocks 210 and 220 may involve shifting power budget from a first component (e.g., CPU and/or MEM) to a second component (e.g., GPU), where the shifted power budget is determined based on a first PSR assigned to the first component and a second PSR assigned to the second component; the shifted power budget may be constrained by a minimal power usage and a maximal power usage of the first component.

Figure 3A:
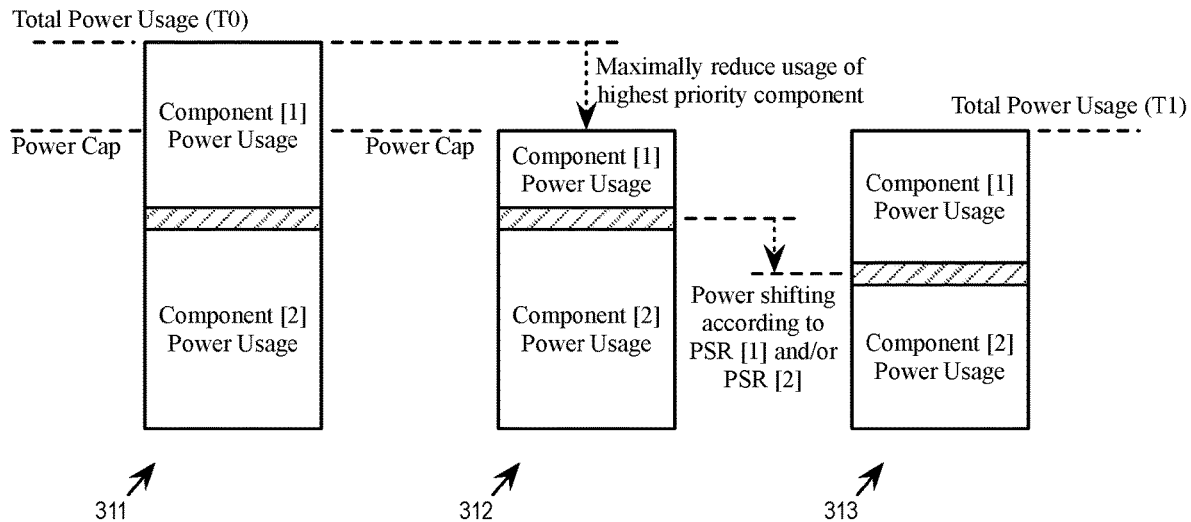
FIGS. 3a-b conceptually illustrates adjustment of total power usage by the power controller 110, consistent with an exemplary embodiment.
Figure 3B:
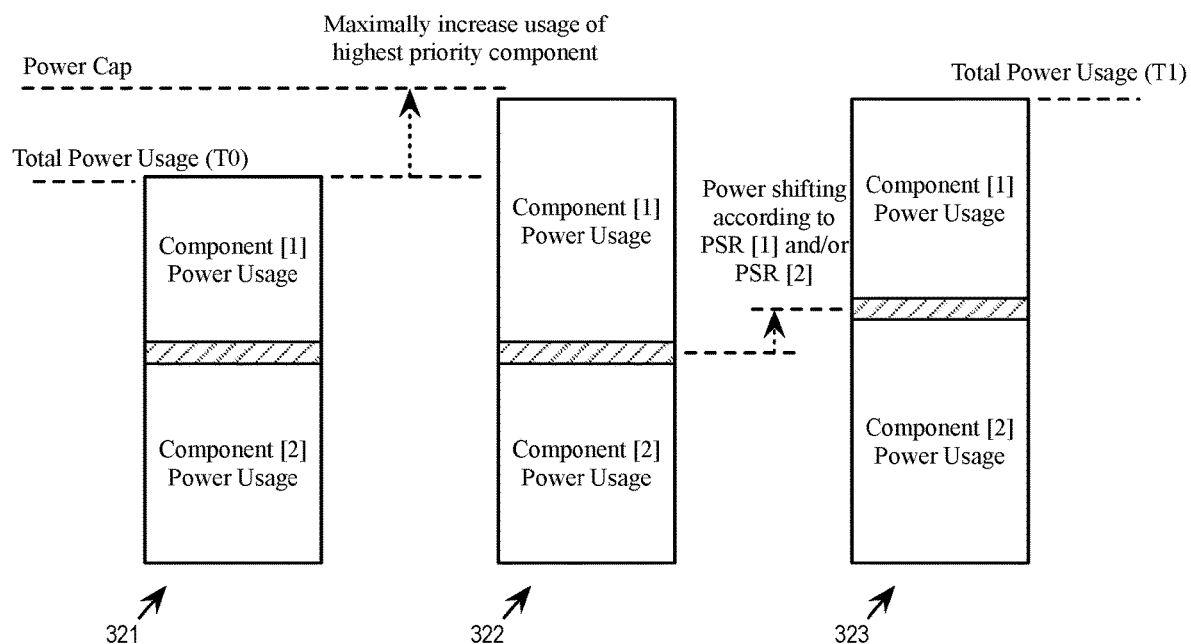

FIGS. 3a-b conceptually illustrates adjustment of total power usage by the power controller 110, consistent with an exemplary embodiment. The total power usage includes power usage by a first component (component[1]) and a second component (component[2]). In three stages 311-313, FIG. 3a illustrates power usage adjustment operations when the total power usage of the heterogeneous system 100 is greater than the power usage cap.

At the first stage 311, the total power usage of the heterogeneous system is greater than a power cap. At the second stage 312, the power controller 110 throttles (or decreases) the power usage of the first component, which is the highest priority component of the heterogeneous system. If the total power usage remain(s) greater than the power usage cap even after the power usage of the first component is maximally throttled, the power controller may throttle the next highest priority component.

At the third stage 313, the power usage of the first component is reduced temporarily so the total power usage can meet (i.e., to be within a threshold range of) the power usage cap. The power controller 110 then performs a power shifting operation to shift some power usage from the second component to the first component according to the PSRs of the first and second components.

In three stages 321-323, FIG. 3b illustrates power usage adjustment operations when the total power usage of the heterogeneous system 100 is less than the power usage cap. At the first stage 321, the total power usage of the heterogeneous system is less than a power cap. At the second stage 322, the power controller 110 un-throttles (or increases) the power usage of the first component, which is the highest priority component of the heterogeneous system. If the total power usage remain(s) less than the power usage cap even after the power usage of the first component is maximally un-throttled, the power controller may un-throttle a next highest priority component.

At the third stage 323, the power usage of the first component is increased temporarily so the total power usage can meet (i.e., to be within a threshold range of) the power usage cap. The power controller 110 then performs (a) power shifting operation (by e.g., performing the step 220 of the process 200) to shift some power usage from the first component to the second component according to the PSRs of the first and second component.

Figure 4:
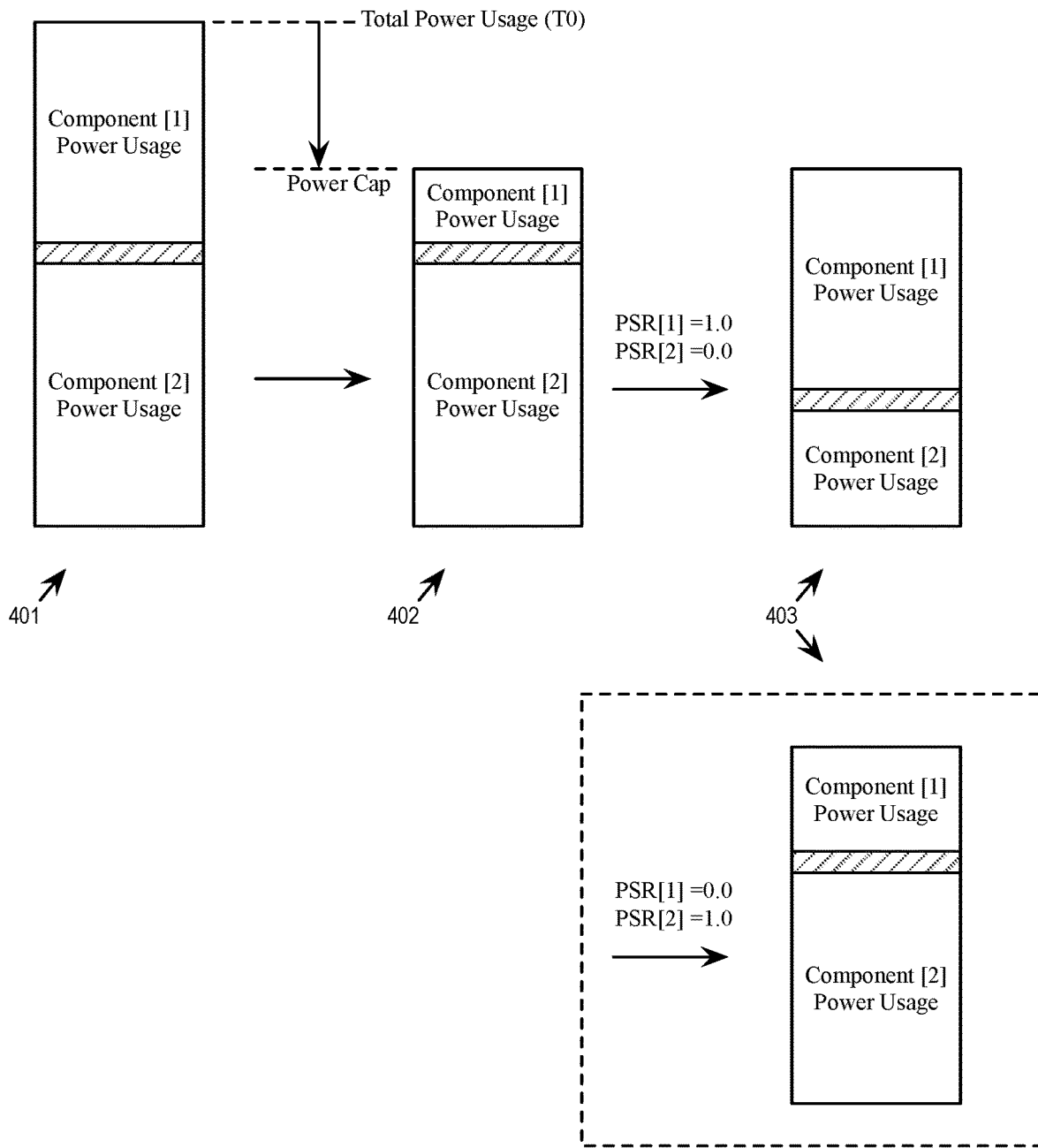
FIG. 4 illustrates power shifting between components of a heterogeneous system based on power shifting ratios of the components, consistent with an exemplary embodiment.

FIG. 4 illustrates power shifting between components of a heterogeneous system based on PSRs of the components, consistent with an exemplary embodiment. In three stages 401-403, the figure illustrates power shifting between a first component (component[1]) and a second component (component[2]) based on the PSR of the first component and the PSR of the second component. The first component may be a highest priority (or first-priority) component and the second component may be a second highest priority (or second-priority) component. In some embodiments, when the PSR of a particular component is 1.0 (or a largest possible value), the power controller takes a minimum amount of power budget away from the particular component. On the other hand, when the PSR of a particular component is 0.0 (or a smallest possible value), the power controller takes a maximum amount of power budget away from the particular component.

As illustrated, at the first stage 401, the total power usage of the heterogeneous system includes power usage by the first component and the second component. This stage shows the original power usages or power budgets of the first and second components prior to any adjustment due to the power usage cap. At the second stage 402, the power controller 110 has lowered the total power usage of the heterogeneous system to meet the power usage cap by reducing the power usage of the first component.

At the third stage 403, the power controller 110 performs power shifting based on the PSR of the first component (PSR[1]) and the PSR of the second component (PSR[2]). If PSR[1] is 1.0 and PSR[2] is 0.0, the power controller may take a minimum amount of power budget away from the first component. In this scenario, the power controller 110 restores the power usage of the first component to its original power budget, while the power usage of the second component is reduced, i.e., power usage is shifted from the second component to the first component. Alternatively, if PSR[1] is 0.0 and PSR[2] is 1.0, the power controller may take a maximum amount of power budget away from the first component. In this scenario, the power controller 110 adjusts the power usage of the first component to its minimum, e.g., by reducing the power budget of the first component. The second component, whose PSR is 1.0, in turn increases its power usage.

As mentioned, the different components of the heterogeneous system may include different types of devices such as CPU, MEM, FPGA, GPU, etc. The power controller may throttle or un-throttle each component according to that component's unique requirement and characteristics. For example, in some embodiments, a set of CPUs and their corresponding memory are managed by the power controller as one component ("CPUs/memory" component). When the total power usage of the heterogeneous system is greater than the power usage cap (i.e., the system needs to reduce power usage), and if the CPU frequency is at the minimum, the power controller sets memory throttles to a set of power cap memory throttle settings; if the CPU frequency is not at minimum, the power controller reduces the CPU frequency by a fraction (CPU's power usage/total power usage). On the other hand, when the total power usage is not greater than the power usage cap (i.e., the system may increase power usage), and/or if the memory power cap throttles are set and there is enough power margin to raise the memory power cap throttles, the power controller un-throttles the memory's power usage. To un-throttle the power usage of the CPUs/ memory component, the power controller increases frequency according to a fraction (the CPU's power usage/total power usage). The PSR of the CPU/memory component may be in range of 0% to 100% to represent the percentage of power to take away from the CPUs/memory component. Specifically, 0% PSR represents a scenario to take as little power away from the CPUs/memory component as possible, while 100% PSR represents a scenario to take as much power away from the CPUs/memory component as possible.

Figure 5:
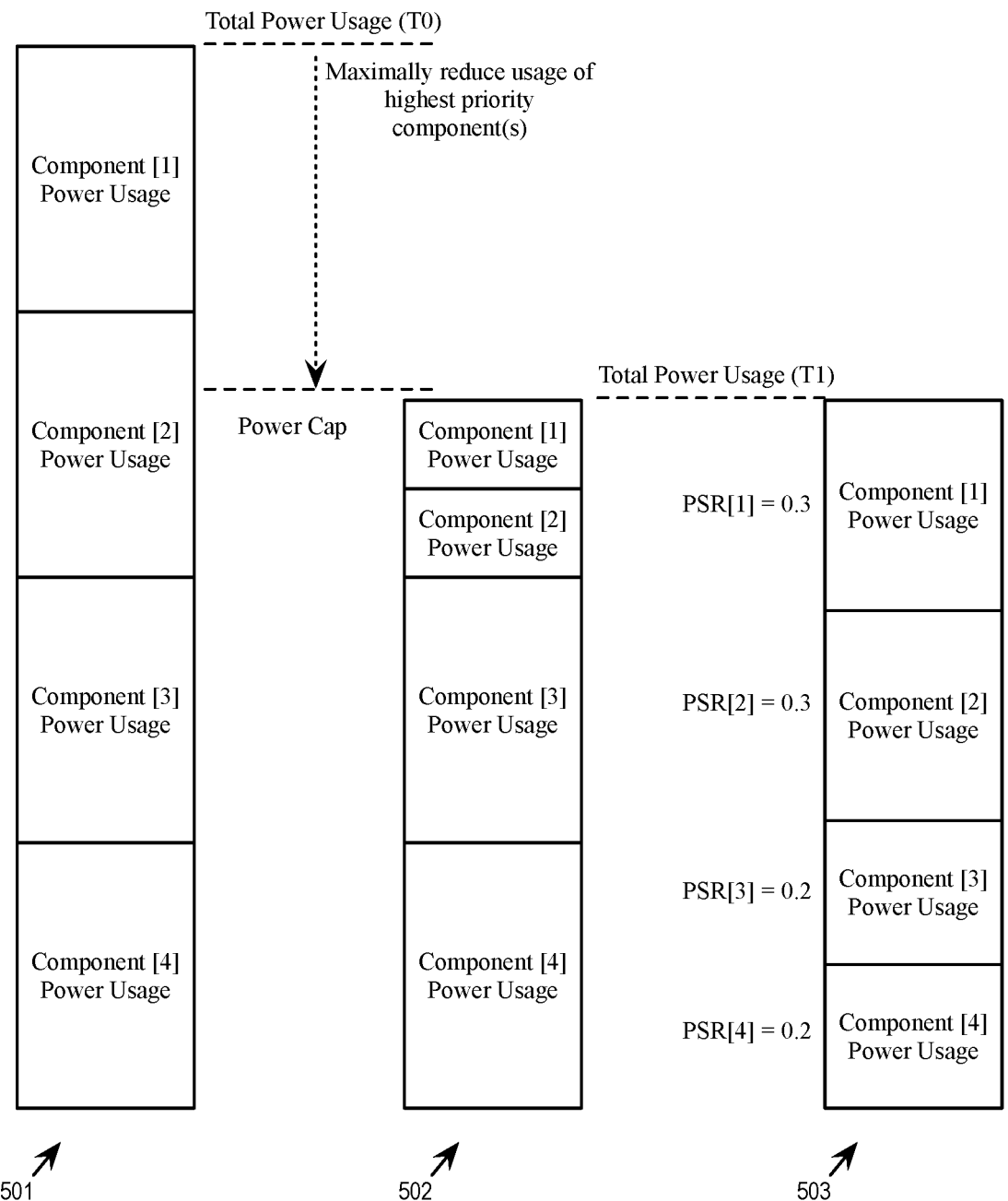
FIG. 5 conceptually illustrates adjustment of total power usage when the power controller reduces the power usage of two or more components in order to satisfy the power usage cap.

FIG. 5 conceptually illustrates adjustment of total power usage when the power controller 110 has to reduce the power usage of two or more components in order to satisfy the power usage cap. The figure also illustrates power shifting among two or more components based on their respective PSRs.

As illustrated, at a first stage 501, the total power usage of the heterogeneous system includes power usage by four components (component[1] through component[4]). This stage shows the original power usages or power budgets of the four components prior to any adjustment due to power usage cap.

At a second stage 502, the power controller 110 has lowered the total power usage to meet the power usage cap by reducing the power usages of the two highest priority components (components [1] and component[2]).

At a third stage 503, the power controller adjusts the power usages of the four components according to their respective PSRs (PSR[1] through PSR[4]). In this example, PSR[1] is 0.3, PSR[2] is 0.3, PSR[3] is 0.2, and PSR[4] is 0.2. In some embodiments, these PSRs correspond to the target percentage or the ratios of the power usages of individual components relative to the total power usage. The power controller reduces power usages of component[3] and component[4] and increases the power usage of component [1] and component[1] so that the power usage of the four components may comport with their corresponding PSRs.

Figure 6:
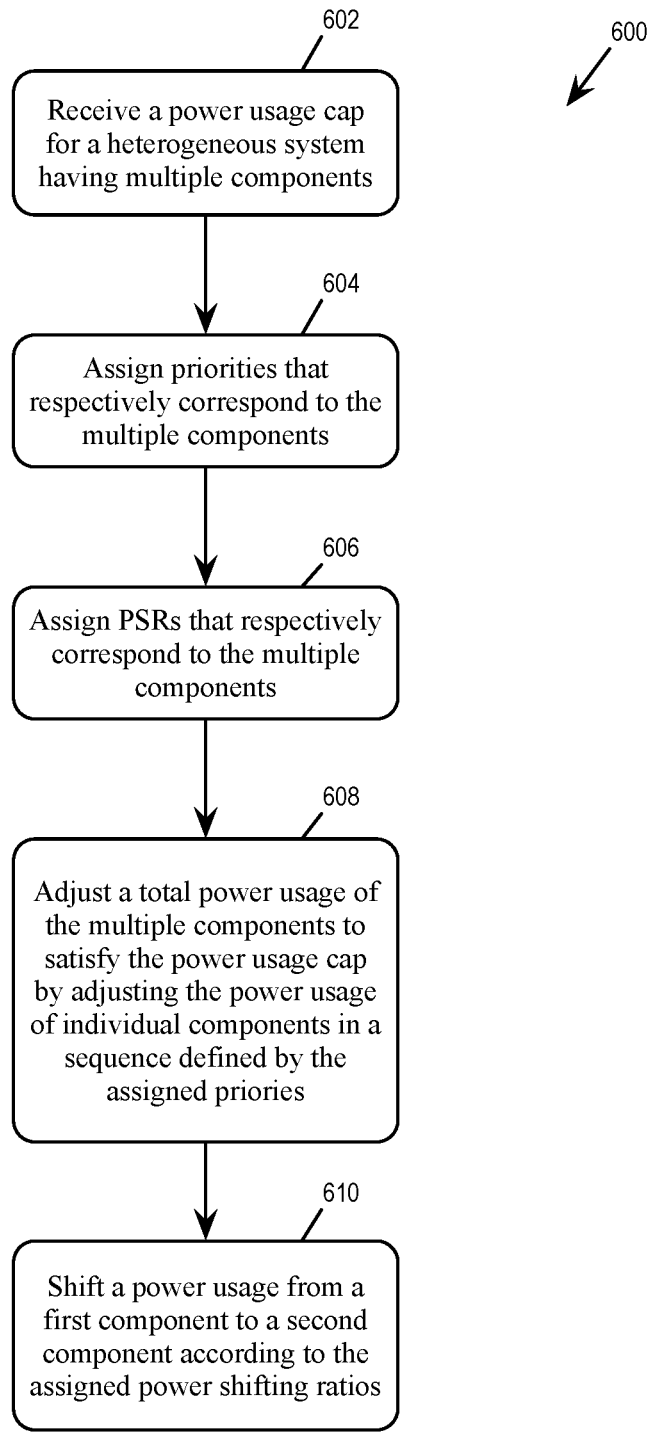
FIG. 6 conceptually illustrates a process for applying a power usage cap to a heterogenous system, consistent with an exemplary embodiment.

FIG. 6 conceptually illustrates a process 600 for applying a power usage cap to a heterogenous system, consistent with an exemplary embodiment. The process 600 is used by the power controller 110 to control the total power usage of the heterogeneous system based on the power usage cap. In some embodiments, one or more processing units (e.g., processor) of a computing device implementing the power controller 110 (e.g., the computing device 120) perform the process 600 by executing instructions stored in a computer readable medium.

The power controller receives (at block 602) a power usage cap for a heterogeneous system having multiple components. The power controller assigns (at block 604) priorities that respectively correspond to the multiple components. The power controller also assigns (at block 606) power shifting ratios (PSRs) that respectively correspond to the multiple components. In some embodiments, the power controller receives the priorities and the PSRs from an administrator. In some embodiments, the power controller determines the priorities and the PSRs based on information related to the heterogeneous system. In some embodiments, the power controller may receive real-time updates of the priorities, the PSRs, and the power usage cap.

The power controller adjusts (at block 608) the total power usage of the multiple components to meet the power usage cap (e.g., to be within a threshold of the power usage cap) by adjusting the power usages of individual components in a sequence defined by the assigned priorities. The power controller may determine whether the power usage cap is satisfied by comparing the total power usage of the heterogeneous system with the received power usage cap. The power controller may also determine whether to increase the total power usage or to decrease the total power usage based on the comparison between the total power usage and the power usage cap. In some embodiments, the power controller adjusts a first power usage of a first component having a highest priority among the assigned priorities and determining whether to adjust a second power usage of a second component having the next highest priority based on the comparison between the total power usage and the power usage cap. Upon determining that the total power usage is greater than the power usage cap by a threshold, the power controller may maximally decrease (or throttle) a power usage of the highest priority component that is identified based on the assigned priorities. Conversely, upon determining that the total power usage is less than the power usage cap by a threshold, the power controller may maximally increase (or un-throttle) a power usage of a highest priority component that is identified based on the assigned priorities.

The power controller shifts (at block 610) a power usage from a first component to a second component according to the assigned power shifting ratios (PSR). More generally, the power controller shifts the power usages among the multiple components according to their corresponding assigned PSRs. Specifically, the power controller shifts a power usage from a first-priority component to a second-priority component (and so on) according to the assigned power shifting ratios. In some embodiments, the power controller shifts the power usages among the multiple components while ensuring that the total power usage stays within a threshold range of the power usage cap. The power controller may shift a power usage from a first component to a second component, with the shifted power usage being determined based on a first PSR assigned to the first component and a second PSR assigned to the second component. The shifted power usage may be constrained by a minimal power usage and a maximal power usage of the first component.

By adjusting power usages of individual components based on priorities, the power controller is able to quickly adjust the total power usage of the heterogeneous system to meet a power usage cap with minimal disruption to the real-time operations of the heterogeneous system. By adjusting power usages of individual components based on their corresponding assigned power shifting ratios (PSRs), the power controller is able to quickly allocate power usages while staying within a threshold range of the power usage cap. This allows the system to dynamically meet its power budget while satisfying its performance requirement(s).

The present application may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 2 and 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
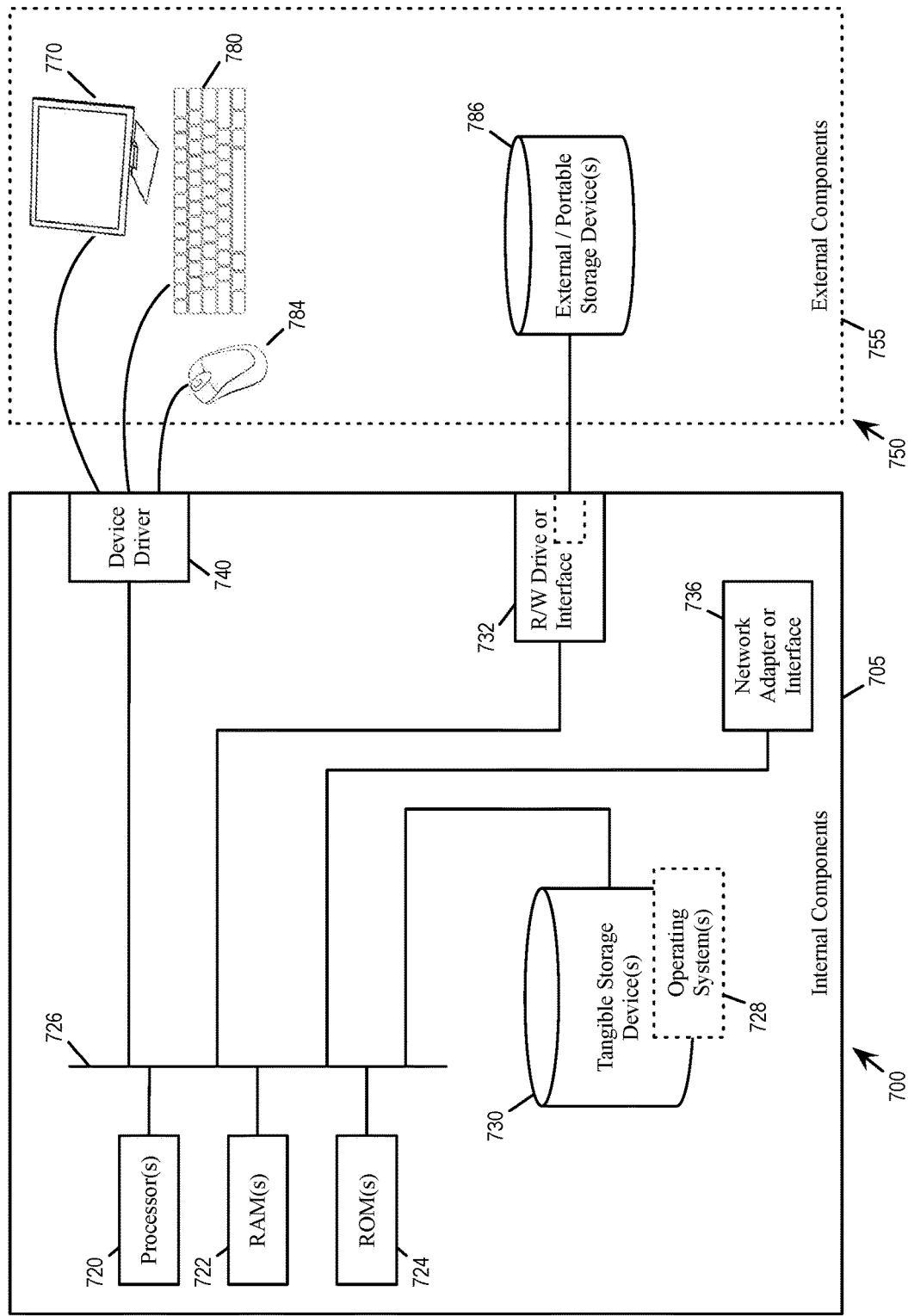
FIG. 7 shows a block diagram of the components of a data processing system in accordance with an illustrative embodiment of the present disclosure.

FIG. 7 shows a block diagram of the components of data processing systems 700 and 750 that may be used to implement a power controller that uses priorities and power shifting ratios to control power usages of a heterogeneous system, in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the processes 200 and 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the processes 200 and 600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

The foregoing one or more embodiments implements a power controller of a heterogeneous system within a computer infrastructure by having one or more computing devices generating power usage control settings to individual components of the heterogeneous system. The computer infrastructure computes the power usage control settings based on a received power usage cap as well as priorities and power shifting ratios assigned to the individual components.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving a power usage cap for a heterogeneous system comprising a plurality of components;
assigning priorities that respectively correspond to the plurality of components;
assigning power shifting ratios that respectively correspond to the plurality of components;
adjusting a total power usage of the plurality of components to be within a threshold of the power usage cap by adjusting power usages of individual components in a sequence defined by the assigned priorities; and
shifting a power usage from a first component to a second component according to the assigned power shifting ratios,
wherein adjusting the power usages of individual components comprises adjusting a first power usage of a first component having a highest priority among the assigned priorities and determining whether to adjust a second power usage of a second component having a highest priority based on a comparison between the total power usage and the power usage cap.

2. The computing device of claim 1, wherein adjusting the total power usage comprises determining whether to increase the total power usage or to decrease the total power usage based on a comparison between the total power usage and the power usage cap.

3. The computing device of claim 2, wherein an execution of the set of instructions by the processor further configures the computing device to perform acts comprising:
upon determining that the total power usage is greater than the power usage cap by a threshold, maximally decreasing a power usage of a highest priority component that is identified based on the assigned priorities.

4. The computing device of claim 2, wherein an execution of the set of instructions by the processor further configures the computing device to perform acts comprising:
upon determining that the total power usage is less than the power usage cap by a threshold, maximally increasing a power usage of a highest priority component that is identified based on the assigned priorities.

5. The computing device of claim 1, wherein the shifted power usage is determined based on a first power shifting ratio assigned to the first component and a second power shifting ratio assigned to the second component.

6. The computing device of claim 5, wherein the shifted power usage is constrained by a minimal power usage and a maximal power usage of the first component.

7. The computing device of claim 1, wherein the total power usage stays within a threshold range of the power usage cap when the power usage is shifted from a first component to a second component of the plurality of components.

8. A computer program product comprising:
one or more non-transitory computer-readable storage devices and program instructions stored on at least one of the one or more non-transitory storage devices, the program instructions executable by a processor, the program instructions comprising sets of instructions for:
receiving a power usage cap for a heterogeneous system comprising a plurality of components;
assigning priorities that respectively correspond to the plurality of components;
assigning power shifting ratios that respectively correspond to the plurality of components;
adjusting a total power usage of the plurality of components to be within a threshold of the power usage cap by adjusting power usages of individual components in a sequence defined by the assigned priorities; and
shifting a power usage from a first component to a second component according to the assigned power shifting ratios,
wherein adjusting the power usages of individual components comprises adjusting a first power usage of a first component having a highest priority among the assigned priorities and determining whether to adjust a second power usage of a second component having a highest priority based on a comparison between the total power usage and the power usage cap.

9. The computer program product of claim 8, wherein adjusting the total power usage comprises:
determining whether to increase the total power usage or to decrease the total power usage based on a comparison between the total power usage and the power usage cap;
upon determining that the total power usage is greater than the power usage cap by a threshold, maximally decreasing a power usage of a highest priority component that is identified based on the assigned priorities; and
upon determining that the total power usage is less than the power usage cap by a threshold, maximally increasing a power usage of a highest priority component that is identified based on the assigned priorities.

10. The computer program product of claim 8, wherein the shifted power usage is determined based on a first power shifting ratio assigned to the first component and a second power shifting ratio assigned to the second component.

11. The computer program product of claim 10, wherein the shifted power usage is constrained by a minimal power usage and a maximal power usage of the first component.

12. The computer program product of claim 8, wherein the total power usage stays within a threshold range of the power usage cap when power usage is shifted from first component to a second component.

13. A computer-implemented method comprising:
receiving a power usage cap for a heterogeneous system comprising a plurality of components;
assigning priorities that respectively correspond to the plurality of components;
assigning power shifting ratios that respectively correspond to the plurality of components;
adjusting a total power usage of the plurality of components to be within a threshold of the power usage cap by adjusting power usages of individual components in a sequence defined by the assigned priorities; and
shifting a power usage from a first component to a second component according to the assigned power shifting ratios,
wherein adjusting the power usages of individual components comprises adjusting a first power usage of a first component having a highest priority among the assigned priorities and determining whether to adjust a second power usage of a second component having a highest priority based on a comparison between the total power usage and the power usage cap.

14. The computer-implemented method of claim 13, wherein adjusting the total power usage comprises:
determining whether to increase the total power usage or to decrease the total power usage based on a comparison between the total power usage and the power usage cap;
upon determining that the total power usage is greater than the power usage cap by a threshold, maximally decreasing a power usage of a highest priority component that is identified based on the assigned priorities; and
upon determining that the total power usage is less than the power usage cap by a threshold, maximally increasing a power usage of a highest priority component that is identified based on the assigned priorities.

15. The computer-implemented method of claim 13, wherein the shifted power usage is determined based on a first power shifting ratio assigned to the first component and a second power shifting ratio assigned to the second component.

16. The computer-implemented method of claim 15, wherein the shifted power usage is constrained by a minimal power usage and a maximal power usage of the first component.

17. The computer-implemented method of claim 13, wherein the total power usage stays within a threshold range of the power usage cap when power usage is shifted from first component to a second component.

* * * * *